Nov. 19, 1968  A. C. O'HARA ET AL  3,411,712
BIMETALLIC DISC VALVE FLOW DIVERTER
Filed June 23, 1966

INVENTORS.
ARTHUR C. O'HARA.
RICHARD C. DREIBELBIS.
BY

ATTORNEY.

United States Patent Office 3,411,712
Patented Nov. 19, 1968

3,411,712
BIMETALLIC DISC VALVE FLOW DIVERTER
Arthur C. O'Hara, Syracuse, N.Y., and Richard C. Dreibelbis, Fair Lawn, N.J., assignors to Carrier Corporation, Syracuse, N.Y., a corporation of Delaware
Filed June 23, 1966, Ser. No. 559,967
1 Claim. (Cl. 236—93)

ABSTRACT OF THE DISCLOSURE

A valve mechanism employing a bimetallic disc, responsive to the temperature of the fluid flowing through the valve, to divert the fluid through one of two valve outlets. The valve is adapted for connection to a return bend of a heat exchanger in a room air conditioning unit to divert control air to the heating or the cooling portion of the room thermostat according to the temperature of the heat exchange medium flowing through the heat exchanger.

Figure 1:
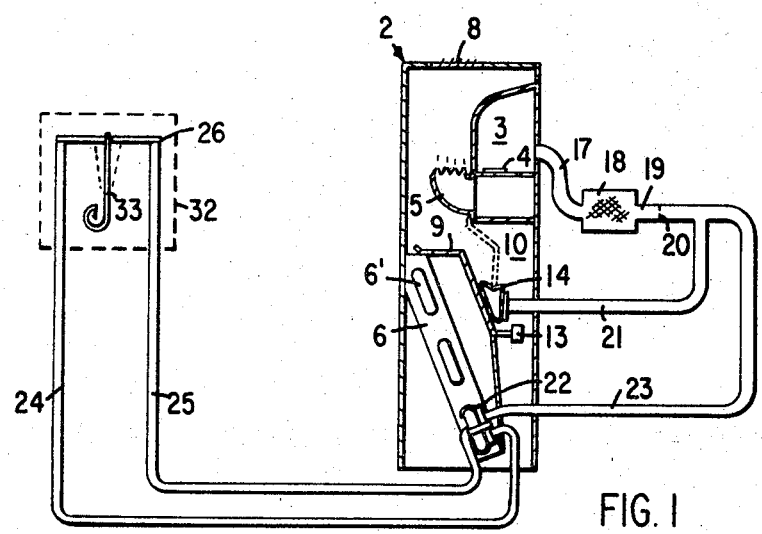

This invention relates generally to a valve mechanism and more particularly to a three-way changeover type of valve mechanism.

A valve mechanism of the type described finds an important application in the field of air conditioning, especially where the air conditioning problem may require alternate heating and cooling. In U.S. Letters Patent No. 3,122,201, granted to Milton H. Coleman and Carlyle M. Ashley, there is disclosed an induction type air conditioning system wherein outside air is treated at a central station and then distributed at relatively high static pressure and a relatively high velocity to a plurality of units, each located in an area to be conditioned. The high pressure air supplied to each unit is discharged therein through discharge nozzles and in this manner secondary air is induced into the unit. The primary or conditioned air and the secondary or induced air are mixed within the unit and are then supplied to the area to be conditioned. Within each unit is a heat exchanger. Preferably, during winter operating conditions, a hot conditioning medium may be supplied to the heat exchanger while during summer operating conditions, a cold conditioning medium may be supplied to the heat exchanger.

It will be understood under some circumstances piping may be so arranged that both hot and cold conditioning medium may be available at each unit. It is preferable that the supply of conditioning medium supplied to each heat exchanger be substantially constant, that the supply of primary air supplied to each unit also be substantially constant, and that the quantity of induced air passing in heat exchange relation with the heat exchanger be varied by means of a damper in the unit which permits a desired quantity of induced air to pass through the heat exchanger of each unit or to bypass the heat exchanger as desired in order to vary the amount of total heat applied to or removed from the induced air while maintaining the total quantity of air discharged from the unit substantially constant.

The damper disclosed in the aforementioned patent is actuated by a control system including an expansible member provided with primary air under a predetermined control pressure from the plenum chamber of each unit. Air passes through a restriction member containing an orifice and is diverted to one of two outlets. One outlet near the orifice is connected to the expansible member for actuating the damper and the other outlet downstream of the orifice is connected to a changeover valve mechanism. The changeover valve mechanism, which is mounted in heat exchange relationship with the heat exchanger, includes a thermally responsive element which senses the approximate temperature of the conditioning medium flowing through the heat exchanger and causes the air passing through the changeover valve to flow to either the heating section or the cooling section of the bleed type thermostatic control mechanism in such control system dependent on winter or summer operating conditions. The air flowing through the control mechanism may be bled to the atmosphere from either the heating portion or the cooling portion of the control mechanism to regulate the pressure within the expansible member depending on the operating condition.

The primary object of this invention is to provide an improved and simplified changeover valve mechanism.

This invention relates to a changeover valve mechanism adapted to be mounted on a bend of a heat exchanger which is adapted to be connected to a source of conditioning medium. The valve mechanism comprises a casing with an end cap thereon forming a housing with a first, a second and a third passageway therein, and a bimetallic element mounted in the housing responsive to a predetermined temperature condition of the casing to selectively communicate the first and second passageways for the first and third passageways.

Figure 2:
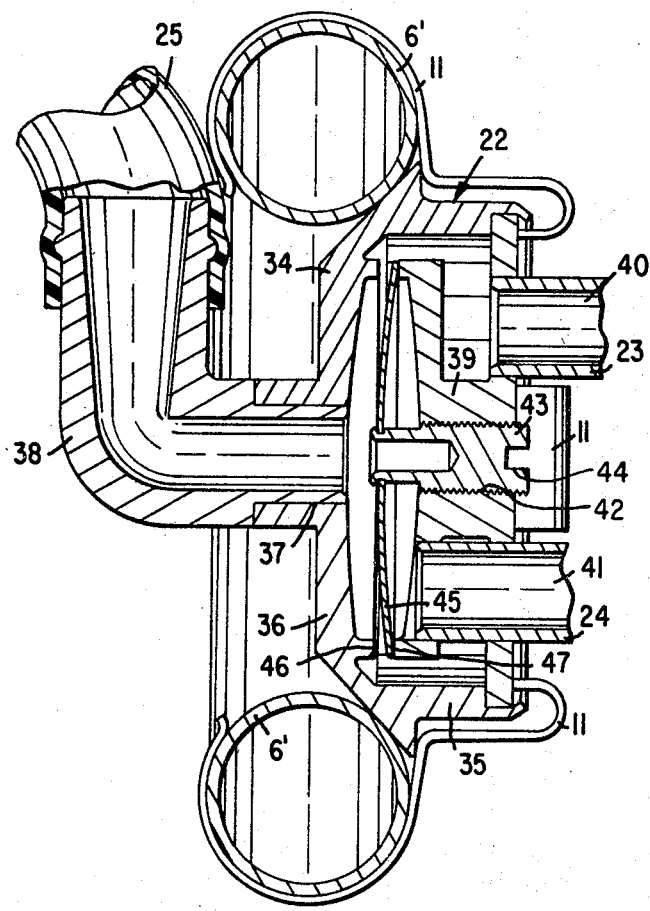

Other objects and features of our invention will be apparent upon a consideration of the ensuing specification and drawings in which:

FIGURE 1 is a diagrammatic view of a control arrangement embodying the present invention as applied to a base unit forming a part of an air conditioning system, and FIGURE 2 is a sectional view of the three-way changeover valve.

Referring to FIGURE 1, there is shown diagrammatically a room unit provided with the control arrangement of the present invention. The room unit includes casing 2 in which is placed plenum chamber 3. The plenum chamber is adapted to be connected to a source of primary air in an air conditioning system. Balancing damper 4 within the plenum chamber regulates the pressure of air supplied to discharge nozzles 5. Suitably mounted in casing 2 is heat exchanger 6. The discharge of primary air from nozzles 5 within the casing induces room air through the open bottom of the casing into heat exchange relation with conditioning medium passing through heat exchanger 6. The induced air mixes with the primary air and is discharged through outlet 8 in the top of casing 2.

The passage of air through heat exchanger 6 is regulated by means of damper 9. When the damper is in the position shown in solid lines in FIGURE 1, secondary air will flow through bypass passage 10 and when the damper is in the position shown in dotted lines in FIGURE 1, secondary air will flow through heat exchanger 6. Damper 9 is pivotally supported within casing 2. The damper is urged clockwise as seen in FIGURE 1 by gravity as by means of a counterbalance 13.

The means for urging damper 9 counterclockwise to bypass secondary air through passage 10 comprises a bellows 14 and control therefor. Control air for actuating the bellows is preferably supplied from plenum chamber 3. One side of the bellows 14 is secured to a portion of the casing 2 while the other side is affixed to damper 9. Air flows from plenum chamber 3 through line 17 to filter 18 which eliminates dust particles from the air. The air then passes through line 19 to the restriction member 20. Control air pressure is transmitted therefrom through line 21 to the bellows 14 for actuating the same.

Restriction member 20 is connected to changeover valve 22 by line 23. Changeover valve 22 which is shown mounted within end bends 6' of heat exchanger 6 by spring clips 11 senses the approximate temperature of the conditioning medium flowing through heat exchanger 6 and diverts the air through either line 24 or 25 to the heating or the cooling portion of thermostat 26.

Thermostat 26 includes a housing 32 having means for circulating room air therethrough. The lines 24 and 25 open within the casing 32 in a heating port and a cooling port. The bleed control 33 operates to selectively bleed air to the atmosphere depending upon the different operating conditions.

Referring to FIGURE 2 there is shown a sectional view of the valve mechanism of the present invention. The changeover valve 22 comprises a casing 34 with generally cylindrical side wall 35 and generally circular end wall 36. A passage 37 is provided in wall 36 for insertion of control air line fitting 38. An end closure member 39 having a generally cylindrical end portion and an upstanding cylindrical center section with a radially extending flange thereon is provided for mating engagement with side wall 35. The end closure member 39 has a control air inlet 40 and a control air outlet 41 formed therein. A threaded hole 42 centrally located in end closure member 39 is provided for receiving threaded mounting post 43. A slot 44 in post 43 for insertion of a screwdriver or like tool is provided for adjusting the axial position of post 43, by rotation thereof. A bimetallic disk 45 is affixed to the inner end of post 43. Opposed upstanding cylindrical flanges 46 and 47 formed on the casing 34 and the end closure member 39 respectively are provided for alternate engagement with the faces of disk 45 at the periphery thereof. The changeover valve can be properly adjusted or calibrated at the factory by rotating post 43, thereby positioning disk 45 in the proper location between flanges 46 and 47.

As illustrated in FIGURES 1 and 2, control air line 23 communicates with changeover valve control air inlet 40, line 24 communicates with changeover valve outlet 41 and line 25 communicates with control air line fitting 38.

Considering the operation of the control system under summer conditions, control air is supplied from plenum chamber 3 through filter 18, and restriction member 20. Pressure downstream of restriction member 20 is transmitted to bellows 14 to operate damper 9. Changeover valve 22 senses the temperature of the conditioning medium flowing through heat exchanger 6. With the temperature of the cooling medium below a first predetermined temperature, the valve 22, in communication with the heat exchanger 6, will assume the temperature of the cooling medium, causing the bimetallic disk 45 to warp toward flange 47. This will provide an air passage between line 23 and line 25. Thus control air will pass from line 23 to the cooling portion of thermostat 26. If the room is overheated, bleed control 33 will open line 25, bleeding control air to the atmosphere, reducing the pressure in bellows 14 causing damper 9 to rotate clockwise, as viewed in FIGURE 1, so that induced air flows over the heat exchanger 6 and is cooled thereby. When the room reaches the proper temperature as determined by the thermostat setting, bleed control 33 will close line 25, building up pressure in lines 25 and 23, expanding the bellows 14 to rotate damper 9 counterclockwise as viewed in FIGURE 1 so that induced air bypasses heat exchanger 6 and is not cooled thereby.

During winter operating conditions, a heating conditioning medium is passed through heat exchanger 6, heating valve 22 and causing the bimetallic disk 45 to warp toward flange 46. This will provide an air passage between line 23 and line 24. Thus control air will pass from line 23 to the heating portion of thermostat 26. If the room is below the desired temperature, bleed control 33 will open line 24, bleeding control air to the atmosphere, reducing the pressure in bellows 14, causing damper 9 to rotate clockwise as viewed in FIGURE 1 so that induced air flows over the heat exchanger 6 and is heated thereby. When the room reaches the proper temperature as determined by the thermostat setting, bleed control 33 will close line 24, building up pressure in lines 23 and 24, expanding bellows 14 to rotate damper 9 counterclockwise as viewed in FIGURE 1, so that induced air bypasses heat exchanger 6 and is not heated thereby.

While we have described a preferred embodiment of our invention, it will be understood that the invention is not limited thereto since it may be otherwise embodied within the scope of the following claim.

We claim:

1. A three-way changeover valve comprising a casing having a generally circular base section and upstanding cylindrical side walls, said base section including an upstanding cylindrical flange concentric with said cylindrical side walls, said casing having an outlet port in said base section centrally located within said upstanding cylindrical flange, an end closure having a generally circular end portion for mating engagement with the upstanding cylindrical walls of said casing, said end closure having an upstanding cylindrical center section projecting into the enclosure formed by said casing and said end closure, said end closure central section having a radially extending flange portion formed on the end thereof with an upstanding cylindrical flange portion formed on the radially extending flange portion opposite the upstanding cylindrical flange on said casing, said end closure having a threaded axial passage extending through the center thereof, said end closure having an inlet and an outlet formed therein, a combination calibration and mounting post, said post having threads formed thereon for engagement with the threads in said end closure, said post having a slot formed in one end thereof for insertion of a screwdriver or like tool for rotating said post and thereby adjusting the axial position of said post in said end closure, a bimetallic disk mounted on the other end of said post between the upstanding cylindrical flange on said casing and the upstanding cylindrical flange portion of said end closure for alternate engagement therewith, said inlet being in communication with the outlet in said casing when said bimetallic disk is in engagement wth the upstanding cylindrical flange on said end closure, said inlet being in communication with the outlet in said end closure when said bimetallic disk is in engagement with the upstanding cylindrical flange on said casing.

References Cited

UNITED STATES PATENTS

| 1,763,802 | 7/1930 | Levy | 236—3 X |
| 2,054,997 | 9/1936 | Vang | 123—122 |
| 2,194,771 | 3/1940 | Semon et al. | 236—93 |

FOREIGN PATENTS

| 558,259 | 12/1943 | Great Britain. | |

ROBERT A. O'LEARY, *Primary Examiner.*

W. E. WAYNER, *Assistant Examiner.*